United States Patent

Reh et al.

[11] Patent Number: 6,041,677
[45] Date of Patent: Mar. 28, 2000

[54] DEVICE FOR ATTACHING A HUB TO A SHAFT, IN PARTICULAR A STEERING WHEEL HUB TO A STEERING COLUMN

[75] Inventors: Stefan Reh, Wörth; Hodac Hung, Niedernberg; Karl Hock, Mömbris; Thomas Marotzke, Bergfelde; Günter Giegerich, Obernburg; Norbert Müller, Aschaffenburg; Bruno Rettinger, Hösbach, all of Germany

[73] Assignee: Petri AG, Aschaffenburg, Germany

[21] Appl. No.: 09/117,647

[22] PCT Filed: Mar. 20, 1997

[86] PCT No.: PCT/DE97/00619

§ 371 Date: Aug. 3, 1998

§ 102(e) Date: Aug. 3, 1998

[87] PCT Pub. No.: WO97/38888

PCT Pub. Date: Oct. 23, 1997

[30] Foreign Application Priority Data

Apr. 15, 1996 [DE] Germany .................. 196 16 234

[51] Int. Cl.[7] ........................................... B62D 1/10
[52] U.S. Cl. ..................... 74/552; 74/484 R; 439/164
[58] Field of Search .................. 74/552, 484 R; 439/15, 164; 403/320, 351, 374

[56] References Cited

U.S. PATENT DOCUMENTS

| 4,917,524 | 4/1990 | Wilcox | 74/552 |
| 5,358,410 | 10/1994 | Kieserling et al. | 439/164 |
| 5,551,886 | 9/1996 | Zeller et al. | 439/164 |
| 5,588,337 | 12/1996 | Milton | 74/552 |
| 5,617,763 | 4/1997 | Cymbol | 74/552 |
| 5,685,559 | 11/1997 | Cuevas | 74/552 |
| 5,752,843 | 5/1998 | Kawamoto et al. | 439/164 |
| 5,848,806 | 12/1998 | Hosoi et al. | 74/552 |
| 5,855,145 | 1/1999 | Hosoi et al. | 74/552 |
| 5,921,147 | 7/1999 | Nagata et al. | 74/552 |
| 5,931,250 | 8/1999 | Kagawa et al. | 74/552 |
| 5,950,499 | 9/1999 | Hosoi et al. | 74/552 |

FOREIGN PATENT DOCUMENTS

| 2715906 | 8/1995 | France . |
| 2724359 | 3/1996 | France . |
| 4106096 | 2/1991 | Germany . |
| 9407807 | 8/1994 | Germany . |
| 4415765 | 11/1995 | Germany . |

Primary Examiner—David A. Bucci
Assistant Examiner—Chong H. Kim
Attorney, Agent, or Firm—Christie, Parker & Hale, LLP

[57] ABSTRACT

A device for attaching a steering wheel hub to a steering wheel column, while simultaneously fixing a contact unit to the steering wheel, includes a fastener that has a head part engaging in the hub and a shank that engages partially in the hub and partially in the shaft. In a locked position, the fastener engages a recess in the contact unit to prevent the steering wheel hub from rotating relative to the stator of the contact unit. In an unlocked position, the fastener partially engages the hub, partially engages the column, and disengages from the recess in the contact unit to fixedly connect the hub to the column and allow the hub, and therefore the rotor of the contact unit, to rotate.

23 Claims, 4 Drawing Sheets

DEVICE FOR ATTACHING A HUB TO A SHAFT, IN PARTICULAR A STEERING WHEEL HUB TO A STEERING COLUMN

FIELD OF THE INVENTION

The invention relates generally to a device for fixing a hub to a shaft, and more particularly to a device for fixing a steering wheel hub to a steering column.

BACKGROUND OF THE INVENTION

It is known to fit steering wheels in motor vehicles on the steering columns and to fix them on the same from above by means of a nut or screw. A steering wheel fixing is also known from German Patent DE 44 15 765 A where the steering wheel hub has a clamping element engaging in the steering column. The steering column is provided with notched teeth which are associated with corresponding teeth in the steering wheel hub. A clamping groove which is associated with a clamping element in the steering wheel hub is provided in the area of the notched teeth in the steering spindle for axially locking the steering wheel hub, and thus the steering wheel, on the steering column. The clamping element thereby extends transversely to the steering column. With this type of fixing it is possible to mount an airbag unit on the steering wheel prior to fixing the steering wheel on the steering column since screwing up the nut from above is not necessary.

Contact units are known for transferring the electrical energy and signals between stationary structural groups and the steering wheel of the motor vehicle. These contact units have a stator fixed on the steering column and a rotor fixed on the steering wheel. A cable runs between the two and is wound up and down during rotation of the steering wheel in dependence on the turning direction. The stator and rotor have plug contacts by means of which they are connected with the steering column and steering wheel.

In practice, the contact unit is mounted at the same time as fitting the steering wheel on the steering column. It is also known from practice to pre-fit the rotor as well as the stator on the steering wheel. Fitting the steering wheel on the steering column takes place in a defined position, preferably when the vehicle wheels are aligned straight. The rotary position of the contact unit must correspond during fitting to this defined position. It is therefore desirable that the contact unit prefitted on the steering wheel already has this position and that this is maintained even during assembly. This has been possible up until now only very expensively by means of separate parts. The same also applies to dismantling.

SUMMARY OF THE INVENTION

The object of the invention is to simplify the fixing of a hub on a shaft, and more particularly the steering wheel on the steering column, even in the case of a prefitted contact unit on the steering wheel.

With a device for fixing a hub on a shaft, more particularly a steering wheel hub on a steering column, with a fixing device engaging transversely into the shaft, wherein a screw is provided as the fixing means which has a head part engaging in the hub, and a shank which engages partly in the hub and partly in the shaft according to the invention with a contact unit provided on the steering wheel and having a rotor fixed on the steering wheel and a stator fixed on the steering column, the stator has a section in which the screw engages in a position of the steering wheel released from the steering column.

This device has the advantage that the screw released the section of the head part projecting from the steering wheel can be used for fixing the contact unit pre-fitted on the steering wheel. Thus the screw provided for fitting the steering wheel on the steering column is used additionally for securing the contact unit against rotation. The added advantage is that this anti-rotational lock is produced simultaneously and automatically on undoing the screw from the steering column. Thus, neither an additional work step is required nor can the process of locking be forgotten. This arrangement represents both a transport security feature which prevents the stator from turning during transport of the steering wheel with the prefitted contact unit, and also an assembly aid which ensures that the steering wheel can only be fitted in a predetermined position, and more particularly in the straight line alignment of the wheels.

It is further expedient that on the edge of the stator there is a recess which has a size allowing the screw to be inserted with the head part into the threaded guide of the steering wheel. The stator of the contact unit thereby preferably represents a hollow cylindrical part which is open to the top and on whose edge a hole or incision is provided as a recess for the screw.

The screw can only be inserted into the threaded guide of the steering wheel if the contact unit is turned so that the recess is aligned with the threaded bore. By turning the screw, the contact unit is fixed whereby the screw is only turned up to a depth where there is still no contact with the steering column. The head part of the screw has such a length that in one position, where the steering wheel and steering column are fixedly connected together by the screw, the screw no longer engages in the recess, i.e. is no longer in engagement with the contact unit. The steering wheel and contact unit are thus unlocked and the steering wheel, and with it the rotor, can be turned.

On the other hand the length of the head part can also be selected so that the head part in the released position of the screw is both guided in the hub and projects out of same.

It is expedient that the head part is provided with an external thread which is associated in the hub with a threaded guide, that the shank of the screw has adjoining the head part a first cylindrical section, that this is adjoined by a conical section for engagement in associated sections of the hub and shaft and that the conical section is adjoined by a second cylindrical section which is associated with a guide in the steering wheel. The second cylindrical section has a smaller diameter than the first cylindrical section.

The sections of the hub and/or shaft associated with the screw are formed as a circumferential recess or groove. Furthermore it is expedient that the first cylindrical section has a larger diameter and the second cylindrical section a smaller diameter than the recess or groove provided on the shaft.

BRIEF DESCRIPTION OF THE DRAWINGS

The invention will now be explained with reference to the embodiments shown in the drawings in which:

FIG. 1 shows a part of the skeleton of a steering wheel 1 to which a rotor 2 of a contact unit is connected. The steering column is not shown in the figure. The rotor 2 is associated with a stator 3 which is guided in a ring groove 4 in the rotor 2. This guide allows the prefitting of also the stator on the steering wheel so that the steering wheel can be supplied to the vehicle manufacturer with the rotor and stator, i.e. as a complete contact unit.

Figure 5:
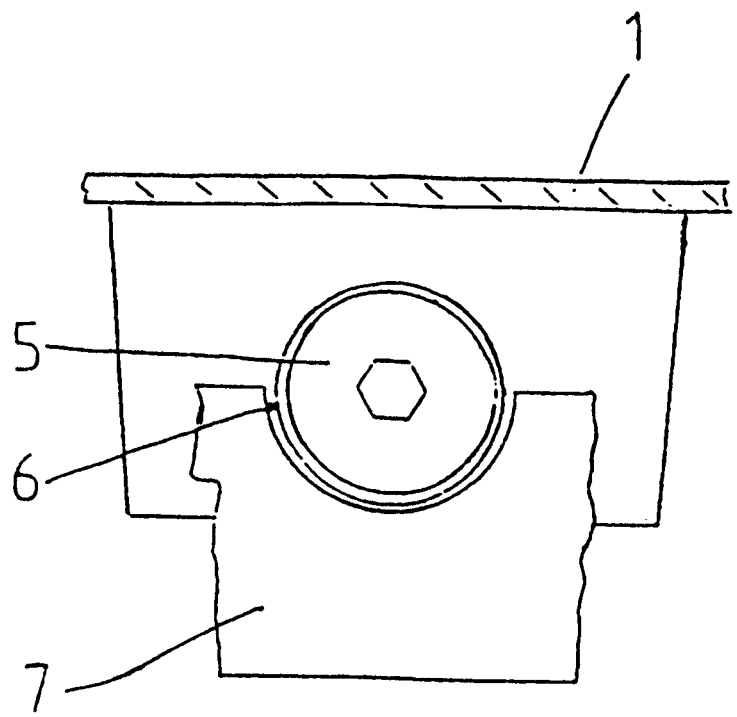
FIG. 5 is a side view A of the steering wheel skeleton of FIG. 1, illustrating the fixing means.

In order to fix the steering wheel 1 on the steering column, which is not shown in FIGS. 1 to 4, a screw 5 is provided which lies transversely relative to the steering column and which, in a released position removed from the steering column, engages in a recess 6 (FIG. 3) on the edge 7 of the stator of the contact unit. These component parts are also shown in the view of FIG. 5. The screw 5 has a head part 8 provided with an external thread wherein the recess 6 has on the edge 7 of the contact unit a size which allows the screw 5 to be inserted with the head part 8 into a threaded guide 9 of the steering wheel 1. The screw furthermore has a shank which, after fixing the steering wheel on the steering column, engages by part of its circumference in the steering wheel hub 10 and by another part in the steering column 11 (FIGS. 6A to 6D). The shank of the screw 5 has adjoining the head part 8 a first cylindrical section 12. This is adjoined by a conical section 13, which is adjoined by a second cylindrical section 14 having a smaller diameter than the first cylindrical section 12.

Figure 1:
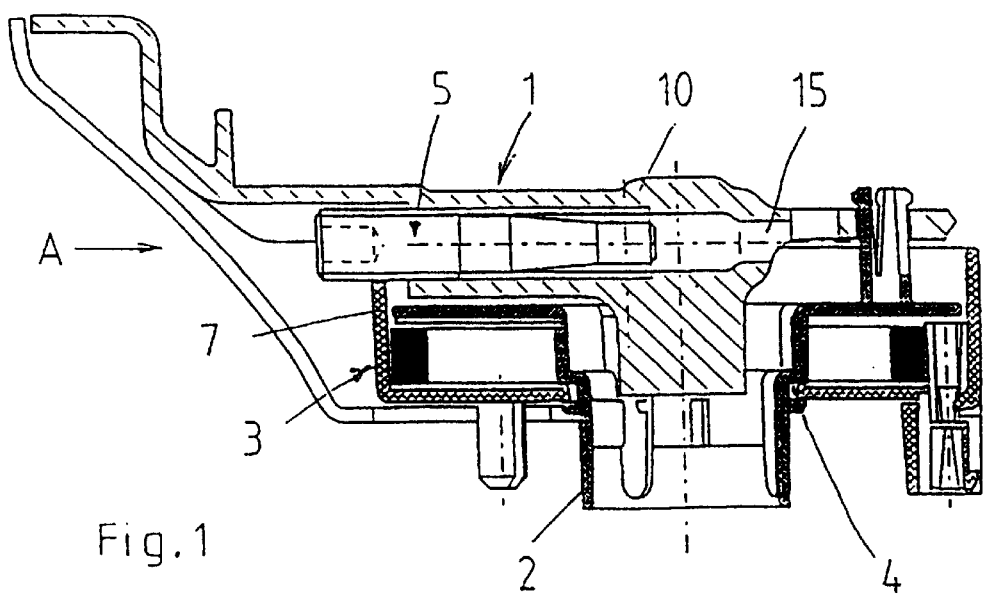
FIG. 1 is a sectional view through a part of a steering wheel skeleton with the contact unit in a locked position.
Figure 2:
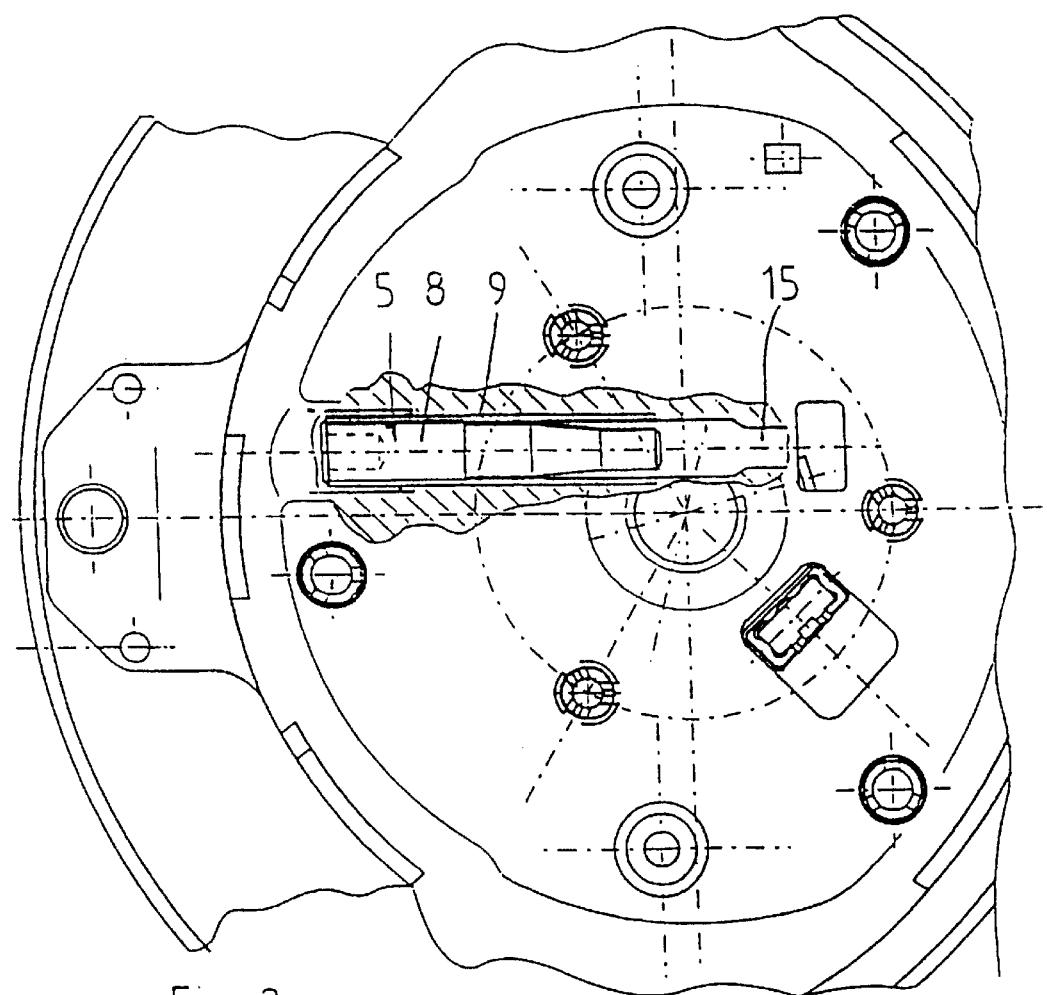
FIG. 2 is a plan view of the steering wheel skeleton of FIG. 1, partially in section.
Figure 3:
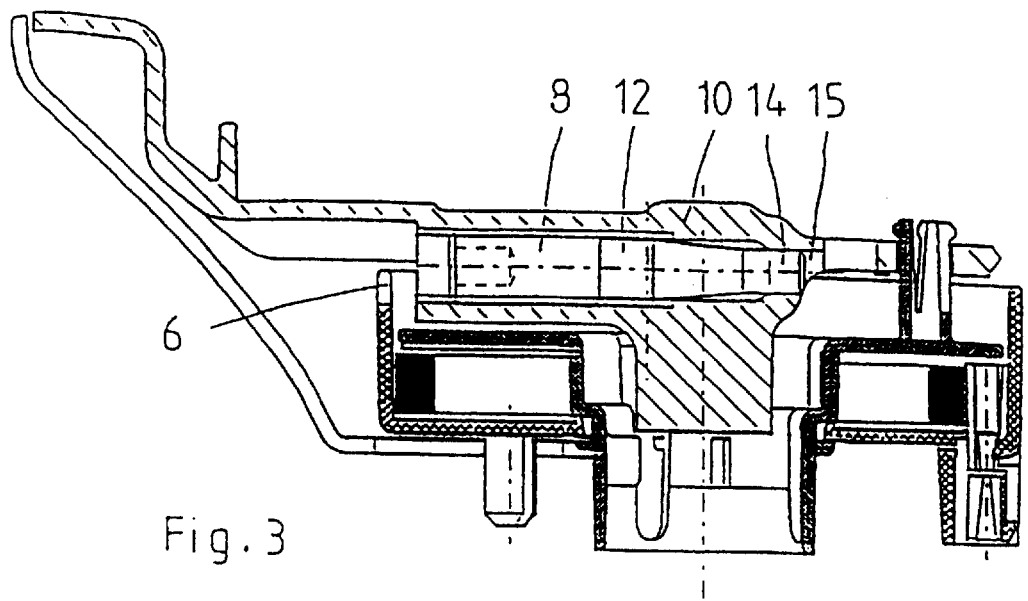
FIG. 3 is a sectional view of the steering wheel skeleton of FIG. 1, with the contact unit in an unlocked position.
Figure 4:
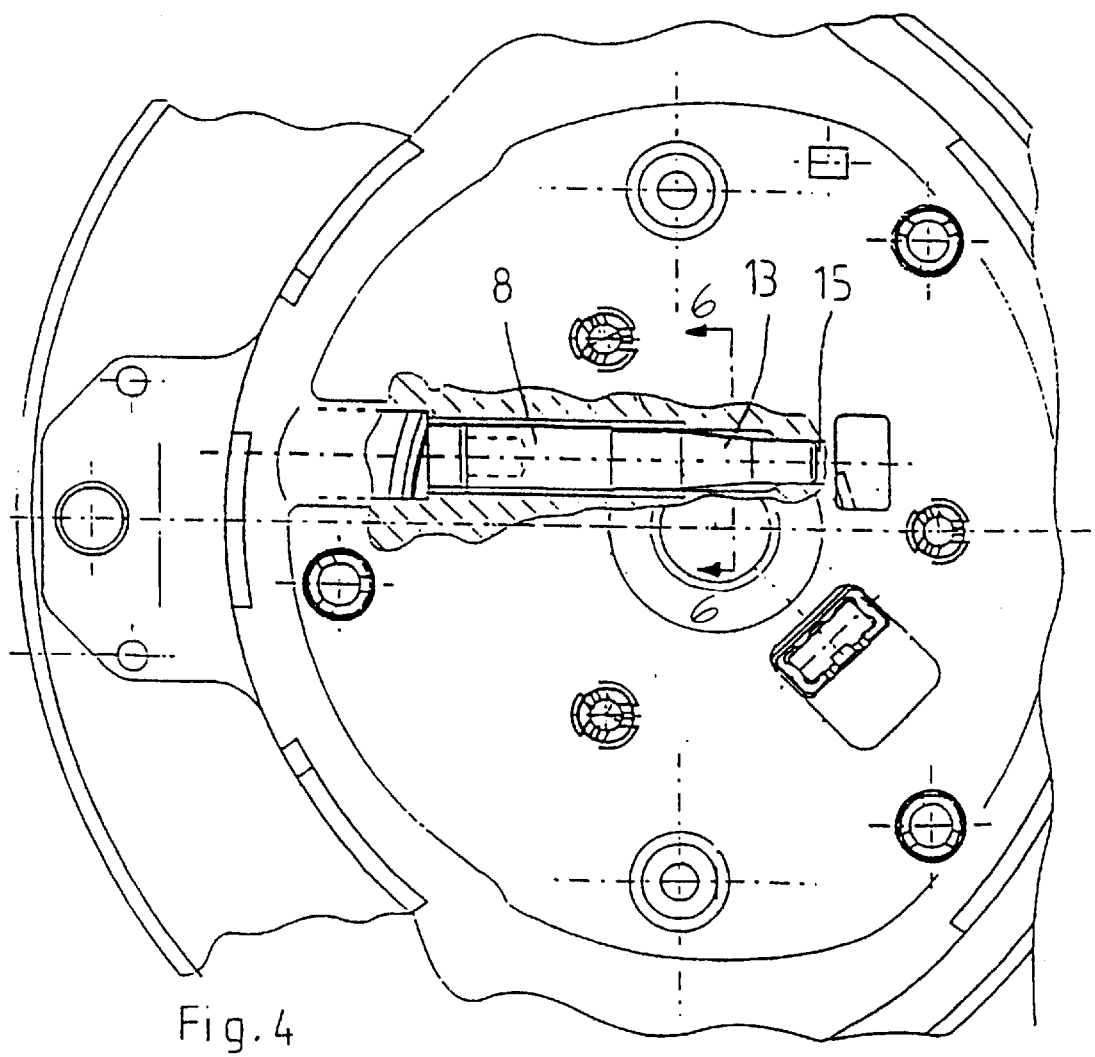
FIG. 4 is a plan view of the steering wheel skeleton according to FIG. 3, partially in section.

FIGS. 1 and 2 show the screw 5 in the released position where the head part 8 engages in the recess 6 (FIG. 3). The stator is thus secured against turning during transport of the steering wheel. Also, in this position the head part 8 is still guided in the threaded guide 9 of the steering wheel 1 so that the head part 8 remains in the recess 6 independently of the position of the steering wheel during transport. Furthermore, during assembly of the steering wheel on the steering column 11 a predetermined position of the rotor relative to the stator is ensured.

During assembly of the steering wheel on the steering column the screw 5 is tightened. The head part 8 is thereby moved inwards over the edge 7 so that the anti-rotation lock is lifted. The rotor can thereby, during rotation of the steering wheel, rotate relative to the stator 3 which is fixed on the steering column 11. In the fitted position of the steering wheel shown in FIGS. 3 and 4, the conical section 13 of the screw 5 engages, in the manner shown in FIG. 6, in the steering wheel hub 10 and steering wheel column 11. The second cylindrical section 14 engages in a cylindrical recess 15 whereby the screw 5 is additionally guided.

Figure 6A:
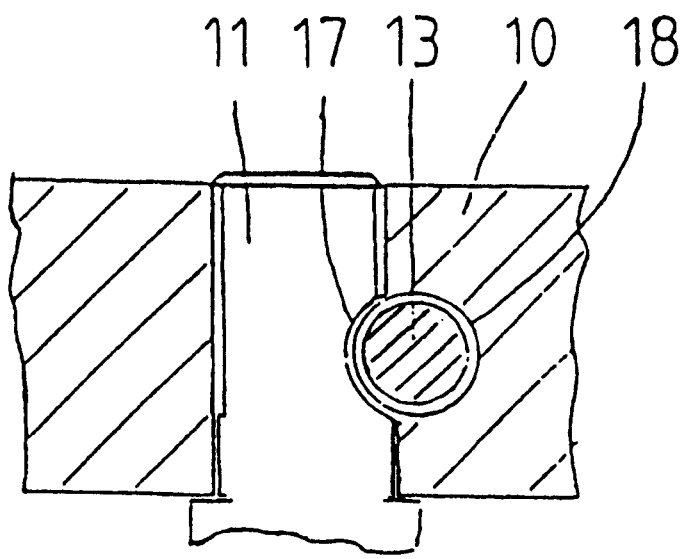
FIGS. 6A–D are sectional views of the fixing means of the steering wheel skeleton taken along lines 6—6 illustrating four different embodiments.
Figure 6B:
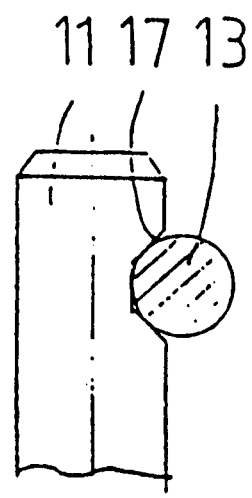
Figure 6C:
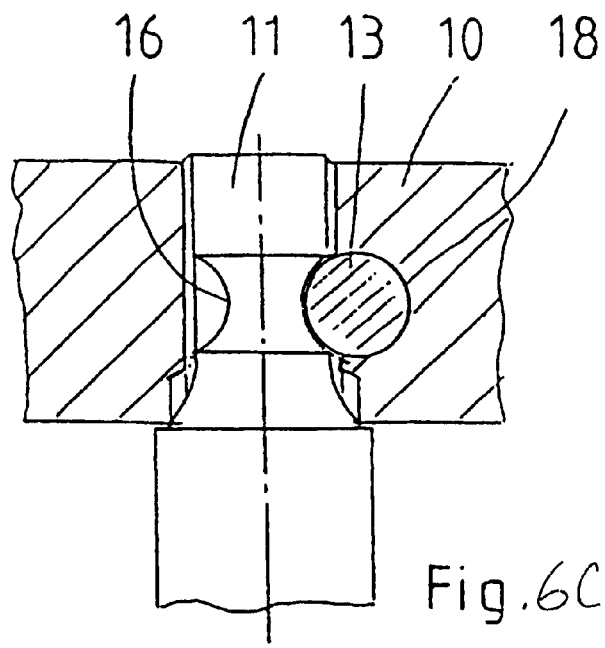
Figure 6D:
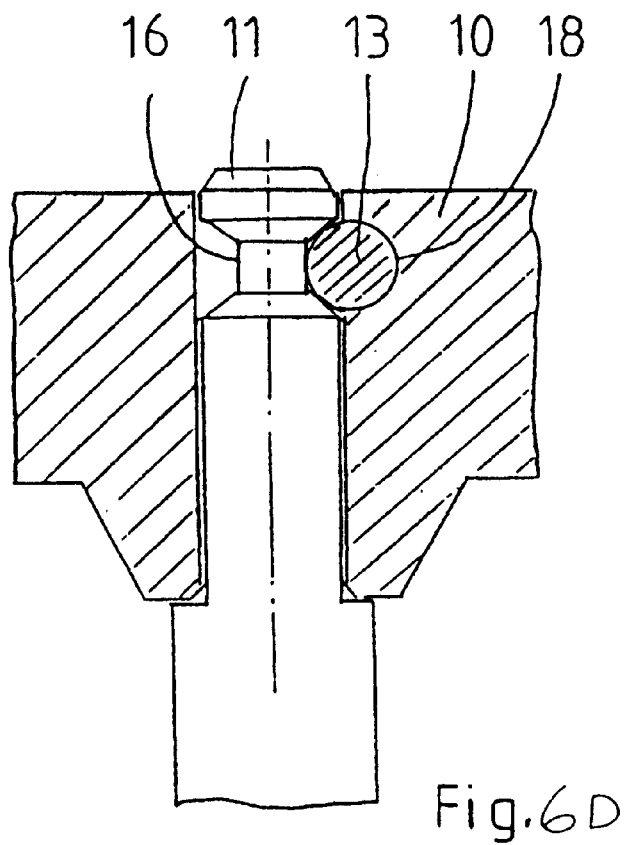

The connection between the steering wheel hub 10 and the steering column 11 is also shown in FIGS. 6A–D. With the embodiments of FIGS. 6A and 6B the steering column 11 has a recess 17 which is opposite a recess 18 in the steering wheel hub 10. When screwing in the screw 5 its conical section 13 engages between the two recesses. The recess 17 can have both a round cross-section, as shown in FIG. 6, and also a polygonal cross-section, as shown in FIG. 6B. In the embodiments of FIGS. 6C and 6D the steering column 11 has a circumferential groove 16 which is associated with a groove 18 in the steering wheel hub 10. The conical section 13 engages on one side in this groove and also engages in the groove 18. The circumferential groove 16 can have both a round cross-section (FIG. 6C) and a polygonal cross-section (FIG. 6D).

What is claimed is:

1. An assembly comprising:

a steering wheel having a steering wheel hub, the hub having a shaft opening for receiving a shaft of a steering column;

fixing means engaging transversely into the shaft opening wherein a screw is provided as the fixing means and has a head part engaging in the hub and a shank which engages partly into the shaft opening; and a contact unit having a stator and a rotor provided on the steering wheel with the rotor fixed on the steering wheel hub, the rotor rotates relative to the stator when the screw engages into the shaft opening, and the stator having a section in which the screw engages to prevent the rotation of the rotor relative to the stator when the screw is in a position released from the shaft opening.

2. The assembly according to claim 1 wherein the stator comprises an edge provided with a recess which has a size which allows the screw to be inserted with the head part into a threaded guide of the steering wheel hub.

3. The assembly according to claim 1 wherein the stator comprises a hollow cylindrical part and a hole is provided on an edge of the stator as a recess for the screw.

4. The assembly according to claim 1 wherein the head part has such a length that when the screw is loosened from the steering column, the head part is both guided in the hub and projects out of the hub.

5. The assembly according to claim 2 wherein the head part is provided with an external thread which is associated in the hub with the threaded guide, and wherein the shank of the screw comprises:

a first cylindrical section, adjoining the head part and having a diameter, a conical section, adjoining the first cylindrical section, for engagement in associated sections of the hub and the column, and a second cylindrical section, adjoining the conical section and having a diameter, which is associated with a guide in the steering wheel hub.

6. The assembly according to claim 5 wherein the diameter of the second cylindrical section is smaller than the diameter of the first cylindrical section.

7. The assembly according claim 6 wherein the hub comprises a recess and the column comprises a recess opposite the recess in the hub, and wherein the screw is adapted to be received between the recess provided in the hub and the recess provided in the column.

8. The assembly according claim 7 wherein the diameter of the first cylindrical section is larger, and the diameter of the second cylindrical section is smaller, than a diameter of the recess provided in the column.

9. The assembly according to claim 7 wherein the recess provided in the column has a round cross-section.

10. The assembly according to claim 7 wherein the recess provided in the column has a polygonal cross-section.

11. The assembly according to claim 6 wherein the hub comprises a recess and the column comprises a circumferential groove opposite the recess in the hub, and wherein the screw is adapted to be received between the recess provided in the hub and the circumferential groove provided in the column.

12. The assembly according to claim 11 wherein the diameter of the first cylindrical section is larger, and the diameter of the second cylindrical section is smaller, than a diameter of the circumferential groove provided in the column.

13. The assembly according to claim 11 wherein the recess provided in the column has a round cross-section.

14. The assembly according to claim 11 wherein the recess provided in the column has a polygonal cross-section.

15. A steering wheel comprising:

a steering wheel hub;

a steering wheel column;

a contact unit having a rotor coupled to the steering wheel hub and a stator having a recess; and a fastener aligned with the recess, wherein, in a locked position, the fastener engages the recess to prevent the steering wheel hub from rotating relative to the stator, and wherein, in an unlocked position, the fastener partially engages the hub, partially engages the column, and disengages from the recess to fixedly connect the hub to the column and allow the hub, and therefore the rotor, to rotate.

16. The steering wheel according to claim 15 wherein the fastener comprises:

an externally threaded head section, and a shank section adjacent to the head section, wherein the shank section includes a first cylindrical section, adjacent the head section and having a diameter, a conical section, adjacent the first cylindrical section, and a second cylindrical section, adjacent the conical section and having a diameter.

17. The steering wheel according to claim 16 wherein the diameter of the second cylindrical section is smaller than the diameter of the first cylindrical section.

18. The steering wheel according claim 17 wherein the hub comprises a recess and the column comprises a recess opposite the recess in the hub, wherein the screw is adapted to be received between the recess provided in the hub and the recess provided in the column, and wherein the diameter of the first cylindrical section is larger, and the diameter of the second cylindrical section is smaller, than a diameter of the recess provided in the column.

19. The steering wheel according to claim 18 wherein the recess provided in the column has a round cross-section.

20. The steering wheel according to claim 18 wherein the recess provided in the column has a polygonal cross-section.

21. The steering wheel according claim 17 wherein the hub comprises a recess and the column comprises a circumferential groove opposite the recess in the hub, wherein the screw is adapted to be received between the recess provided in the hub and the circumferential groove provided in the column, and wherein the diameter of the first cylindrical section is larger, and the diameter of the second cylindrical section is smaller, than a diameter of the circumferential groove provided in the column.

22. The steering wheel according to claim 21 wherein the recess provided in the column has a round cross-section.

23. The steering wheel according to claim 21 wherein the recess provided in the column has a polygonal cross-section.

* * * * *